(12) United States Patent
Muntz

(10) Patent No.: US 9,723,821 B2
(45) Date of Patent: Aug. 8, 2017

(54) FISHING LURE, HOOK APPURTENANCE FOR FISHING LURE, AND METHOD OF CASTING

(71) Applicant: Andrew Muntz, St. Paul, MN (US)

(72) Inventor: Andrew Muntz, St. Paul, MN (US)

(*) Notice: Subject to any disclaimer, the term of this patent is extended or adjusted under 35 U.S.C. 154(b) by 204 days.

(21) Appl. No.: 14/249,187

(22) Filed: Apr. 9, 2014

(65) Prior Publication Data
US 2015/0096219 A1 Apr. 9, 2015

Related U.S. Application Data

(60) Provisional application No. 61/810,679, filed on Apr. 10, 2013.

(51) Int. Cl.
| | |
|---|---|
| *A01K 85/00* | (2006.01) |
| *A01K 91/02* | (2006.01) |
| *A01K 83/00* | (2006.01) |
| *A01K 85/10* | (2006.01) |

(52) U.S. Cl.
CPC .............. *A01K 83/00* (2013.01); *A01K 85/10* (2013.01); *A01K 91/02* (2013.01)

(58) Field of Classification Search
CPC ........ A01K 85/00; A01K 85/02; A01K 97/00; A01K 99/00; A01K 91/02
See application file for complete search history.

(56) References Cited

U.S. PATENT DOCUMENTS

| | | | |
|---|---|---|---|
| 890,549 | A * | 6/1908 | Zamel .................... A01K 85/02 43/42.1 |
| 973,479 | A | 10/1910 | Cooper |
| 1,395,533 | A | 11/1921 | Tuttle |
| 1,420,422 | A | 6/1922 | Foss |
| 1,455,624 | A | 5/1923 | Koch |
| 1,589,065 | A | 6/1926 | Gere et al. |
| 1,856,043 | A | 4/1932 | Pflueger |
| 2,162,966 | A | 6/1939 | Ozbum |
| 2,206,274 | A | 7/1940 | Wiberg |
| 2,215,764 | A | 9/1940 | Okesson et al. |
| 2,323,096 | A | 6/1943 | McDowell |
| 2,610,429 | A | 9/1952 | Thomas |
| 2,611,984 | A | 9/1952 | Gautsche, Jr. |
| 2,612,715 | A | 10/1952 | Wadlington et al. |
| 2,619,761 | A | 12/1952 | Homa |
| 2,660,827 | A | 12/1953 | Pero |
| 2,674,823 | A | 4/1954 | Gellings |
| 2,823,483 | A | 2/1958 | Malott |

(Continued)

FOREIGN PATENT DOCUMENTS

EP        2 130 432 A1    12/2009

*Primary Examiner* — Kathleen Alker
(74) *Attorney, Agent, or Firm* — Merchant & Gould P.C.

(57) ABSTRACT

A fishing lure and method of casting are disclosed. In one aspect, a lure assembly includes a fishing hook having an eyelet and a bend separated by a shank, the bend terminating at a point separated from the shank by a gape. The lure assembly further includes a hook appurtenance attached to the fishing hook and positioned past the bend generally aligned with the shank of the fishing hook. The hook appurtenance includes an ergonomic mass forming a resilient structure for gripping by a person, the ergonomic mass having a size smaller than a gape of the hook to avoid interfering with operation of the fishing hook.

9 Claims, 8 Drawing Sheets

(56) References Cited

U.S. PATENT DOCUMENTS

| | | | | |
|---|---|---|---|---|
| 3,093,923 | A | | 6/1963 | Jackson |
| 4,942,689 | A | * | 7/1990 | Link ...................... A01K 95/00 43/42.24 |
| 4,998,371 | A | | 3/1991 | Driesel |
| 5,245,783 | A | * | 9/1993 | Cumiskey .............. A01K 85/00 43/42.37 |
| 5,386,658 | A | * | 2/1995 | Ferguson ............... A01K 97/26 43/42.25 |
| 5,673,508 | A | * | 10/1997 | Snyder ................... A01K 85/00 43/42.37 |
| 5,890,317 | A | * | 4/1999 | Hollomon .............. A01K 85/00 43/42.31 |
| 5,956,887 | A | | 9/1999 | Mostovsky |
| 7,424,786 | B1 | * | 9/2008 | Nelson ................... A01K 83/00 43/42.39 |
| 2003/0233781 | A1 | * | 12/2003 | Pezzente ................ A01K 97/04 43/42 |
| 2007/0169399 | A1 | * | 7/2007 | More ..................... A01K 91/04 43/44.83 |
| 2015/0128477 | A1 | * | 5/2015 | Heesch .................. A01K 85/10 43/42.02 |

\* cited by examiner

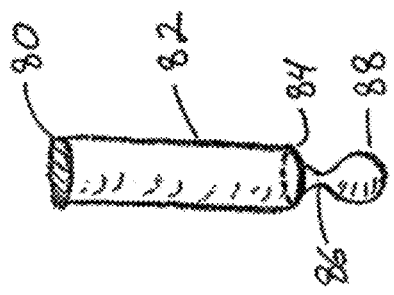
FIG. 14
FIG. 15
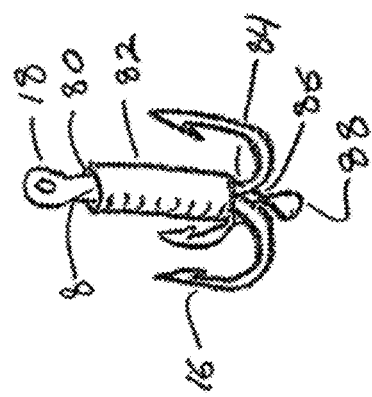
FIG. 16
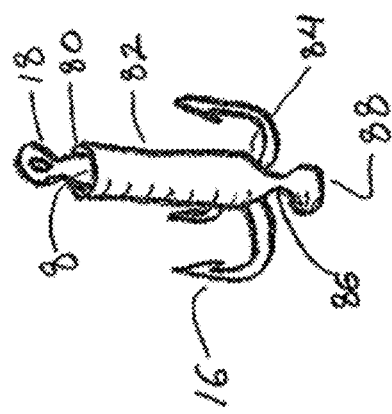
FIG. 17

FISHING LURE, HOOK APPURTENANCE FOR FISHING LURE, AND METHOD OF CASTING

CROSS-REFERENCE TO RELATED APPLICATIONS

The present application claims priority from U.S. Provisional Patent Application No. 61/810,679, filed Apr. 10, 2013, the disclosure of which is hereby incorporated by reference in its entirety.

TECHNICAL FIELD

The present disclosure relates generally to fishing equipment, and in particular to a fishing lure, a hook appurtenance for a fishing lure, and a method of casting of a fishing lure.

BACKGROUND

Many different types of fishing lures exist, and are particularly tailored to attract a variety of species of fish. Additionally, different lures are tailored for use in different weather conditions and water conditions. Additionally, many different rods, reels, and other devices have been constructed to provide easy, accurate casting of such fishing lures to desired locations, for example to accurately locate such lures where fish are hiding. However, little attention has been paid to the lure itself when considering casting methods or casting accuracy. As such, the type or shape of lure can limit the types of casting techniques that can be used.

One method of casting a lure is referred to as a "slingshot cast" or a "bowspring cast". In a slingshot cast, an angler will grip either the line or a lure connected thereto, and pull on the line such that the tip of the rod bends from a straight position to a bent position. The angler will then release the line or lure, causing the lure to slingshot out to a desired location. This method of casting is particularly accurate, specifically for casting under or around branches or other debris where fish typically reside. However, it has potential drawbacks. Specifically, because lures typically have hooks, and in particular hooks at trailing locations on the lure, it can be difficult to reliably grip the lure in a way that releasing the lure does not cause a trailing hook positioned behind the angler's grip location to catch the angler's hand during the cast. Furthermore, it can be difficult to grip either the hook or other features that may trail a hook (e.g., feathers or other delicate features of the lure).

For these and other reasons, improvements are desirable.

SUMMARY

In accordance with the following disclosure, the above and other issues are addressed by the following:

In a first aspect, a method of casting a fishing lure is disclosed. The method includes affixing a fishing lure to a fishing rod via fishing line, the fishing lure including an ergonomic mass positioned at a point extending beyond a bend of a hook, for example to provide a grip point for an angler. The method further includes propelling the fishing lure to an intended location by gripping said mass and applying tension in the line sufficient to flex or bend the fishing rod. The method further includes releasing the mass, thereby releasing the tension in the line and allowing return of the fishing rod to an unflexed position. This causes the lure and associated fishing line to be propelled using a "slingshot cast" or "bowspring cast".

In a second aspect, a hook appurtenance is disclosed that includes a mass that is sized and positioned to endure abrasions and repeated gripping and releasing use, yet still as not to interfere with the action of the attached lure to which it resides. In some aspects, the hook appurtenance includes a spherical shape with a connective conduit to attach to the hook positioned on an outside of the bend.

In a third aspect, a lure assembly includes a fishing hook having an eyelet and a bend separated by a shank, the bend terminating at a point separated from the shank by a gape. The lure assembly further includes a hook appurtenance positioned past the bend generally aligned with the shank of the fishing hook, the hook appurtenance including an ergonomic mass forming a resilient structure for gripping by a person, the ergonomic mass formed as a unitary part of the fishing hook and having a size smaller than a gape of the hook to avoid interfering with operation of the fishing hook.

In a still further aspect, a device applied to a hook is disclosed that does not interfere physically with hooking or catching a striking fish during retrieval. In some aspects, the hook may also be aesthetically dressed with hair or feathers as to disguise the preferred device, which itself may also be of a particular color as to facilitate an attractive appearance.

In further example aspects, the device can be applied to a single, double or treble hook as to be largely universal enough to be incorporated in the construction of the lure or to be added as a attachable item to various types of lures including, but not limited to; spoons, plugs, spinners and topwater lures, whereas an existing hook may be substituted for a hook including the appurtenance.

BRIEF DESCRIPTION OF THE DRAWINGS

FIG. 14 shows a transverse view of a hook sleeve useable as a hook appurtenance in a further embodiment.

FIG. 15 shows an opposite transverse view of the hook sleeve of FIG. 14.

FIG. 16 shows a transverse view of the hook sleeve of FIG. 14 positioned over a treble hook.

FIG. 17 shows an opposite transverse view of a hook sleeve over a treble hook as seen in FIG. 16.

DETAILED DESCRIPTION

As briefly described above, embodiments of the present invention are directed to fishing equipment, and in particular to a fishing lure, a hook appurtenance for a fishing lure, and a method of casting of a fishing lure. In particular, the present application describes a hook appurtenance useable with a fishing lure or assembly to perform a method of casting of a lure using a "slingshot" or "bowspring" casting method. Accordingly, in some embodiments discussed herein, the hook appurtenance can be referred to as a "slingshot bead." Although in various embodiments a traditional bead can be included and/or used as the slingshot bead as the most practically available material, other types of shapes or materials can be used.

Figure 1:
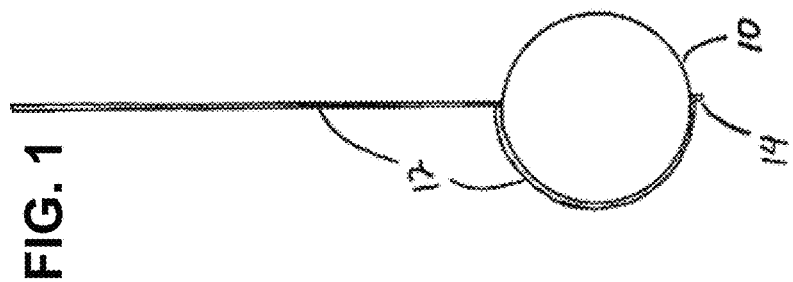
FIG. 1 shows a transverse view of a portion of an assembly including fishing line and an associated bead, forming a hook appurtenance.

Referring now to the drawings in detail wherein for the purpose of illustration we have disclosed example embodiments of the invention, FIG. 1 illustrates a hook appurtenance, shown as bead 10 to which a length of line 12 has been knotted 14. The unknotted end of line 12 is inserted into a hole in the bead 10 and drawn out the other side of the bead 10. The line 12 is then reinserted at the first side of the bead 10, so that the line may be cinched tightly against the bead 10 until the knot 14 becomes flush with the bead 10. In the embodiment shown, in particular in FIG. 2, two lengths of line will be contained side by side within the bead 10. In such embodiments, the line 12 is generally sized with a thickness that is approximately half of the inner bead 10 diameter, so that the knotted end 14 does not pull through the bead 10.

Figure 18:
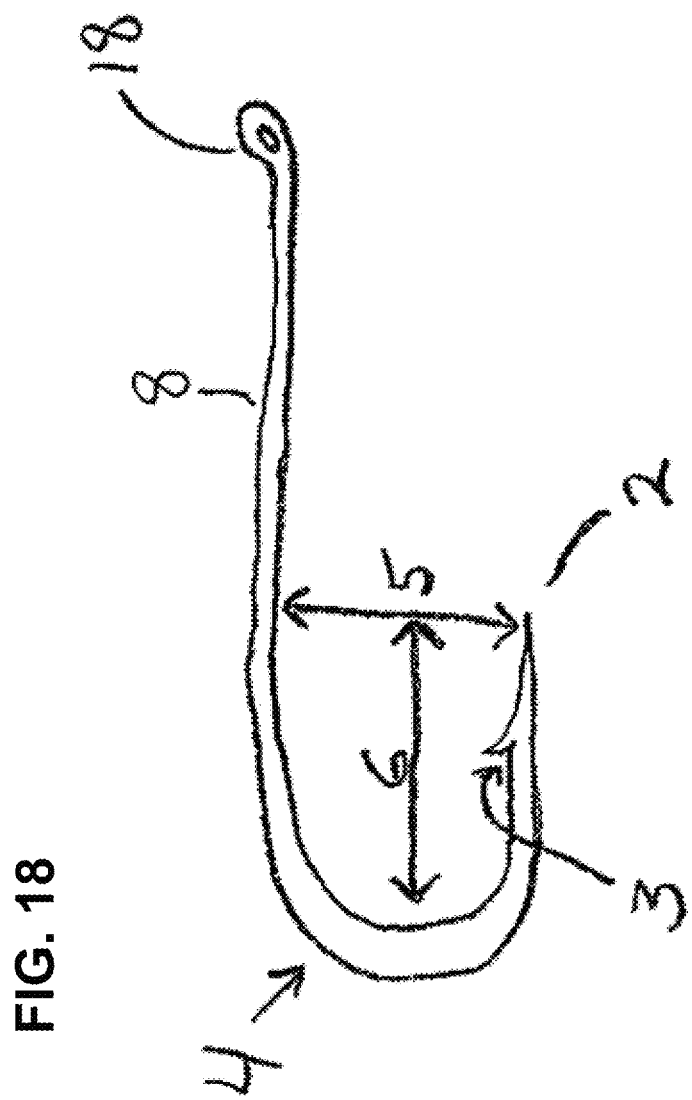
FIG. 18 shows a side view including general parts description of a hook that can be included in a lure.

As illustrated in FIG. 18, parts of hooks are typically referred to with hook specific names. An eyelet 18 is formed from the end of a long straight section of metal, called the shank 8 which begins to turn at the bend 4 about 180 degrees and then continues upward to a barb 3 and a sharp end known as the point 2. The distance between the shank 8 and the point 2 is the gape 5. The distance between the middle of the bend 4 and the gape 5 is the bite/throat 6.

Figure 3:
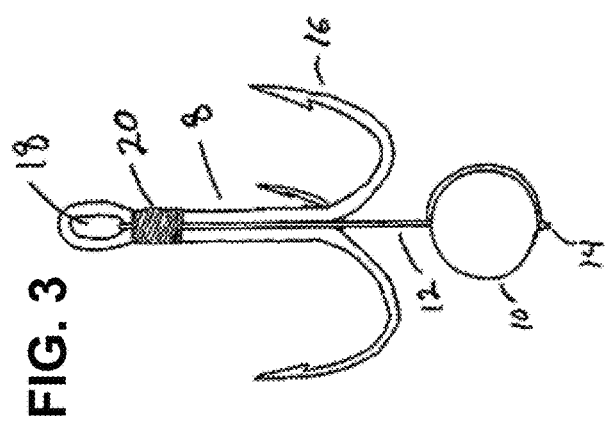
FIG. 3 shows a transverse view of the bead and line assembly as attached with thread to a treble hook.
Figure 2:
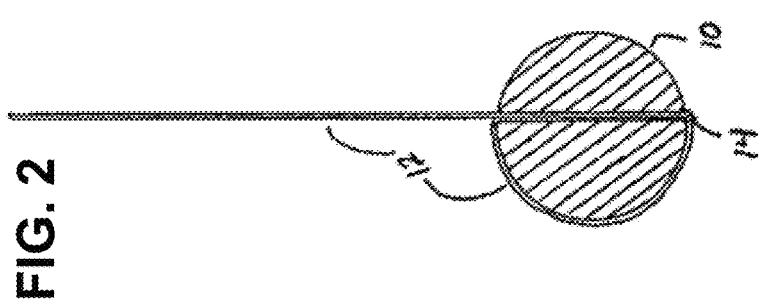
FIG. 2 shows a cutaway transverse sectional view of the fishing line as it is attached to a bead, forming a hook appurtenance.

As illustrated in FIG. 3, this bead 10 and line 12 assembly illustrated in FIGS. 1-2 is placed on the shank 8 of a hook 16 with the line 12 end through the hook eyelet 18 and placed down the opposite side of shank 8 the hook 16. Thread 20 is then wrapped around the hook 16 below the hook eyelet 18 to encompass the line 12 on both sides. Optionally, an adhesive is used to cure the thread 20 permanently. Alternatively, the thread 20 can be fused or otherwise permanently affixed to the bead 10.

Figure 4:
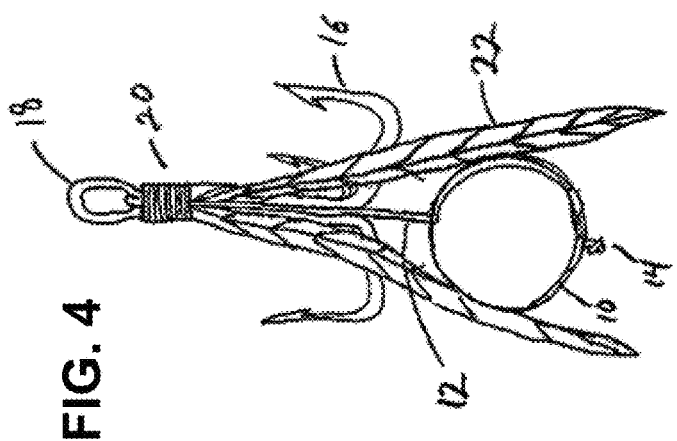
FIG. 4 shows a transverse view of the bead and line assembly as attached to a dressed treble hook, forming the hook appurtenance as part of a lure.
Figure 5:
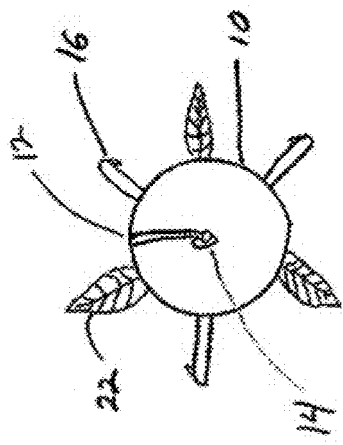
FIG. 5 shows a rear view of the line and bead assembly affixed to a dressed treble hook as seen in FIG. 4.

As illustrated in FIG. 4, with the addition of hair or feathers 22, the hooked becomes dressed around the example embodiment shown. Furthermore, although illustrated in FIG. 5 the bead 10 is shown centered behind the hook 16, in alternative embodiments the bead could be placed in other locations where it can be positioned to be gripped while allowing for unobtrusiveness regarding the hook 16.

Figure 6:
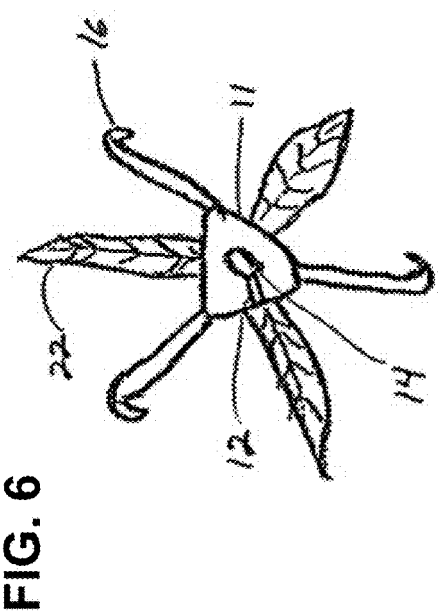
FIG. 6 shows a rear view of the line and pyramid shaped bead assembly affixed to a dressed treble hook.

FIG. 6 illustrates an alternative example hook appurtenance including bead 11. As illustrated in FIG. 6, the bead 11 can be affixed in the same manner as discussed above, but can take a variety of other shapes. In the example shown, the bead 11 is at least partially prism-shaped. In alternative embodiments, other shapes, such as cubic or rounded shapes, could be used as well.

In general the hook appurtenances of the present disclosure can take any of a variety of shapes and sizes; however, in some cases, a preferred size of the hook appurtenance will be generally smaller than the hook with which it is associated, such that the hook appurtenance does not interfere with operation of the hook. In example embodiments, the diameter or width of the hook appurtenance will not exceed about ½ the gape of the hook; however, in alternative embodiments, various sizes of hooks and hook appurtenances can be used. In one example, a hook having a ¼" gape can be used with a spherical hook appurtenance having a diameter of about ⅛". In a further example a hook having a ⅜" gape can be used with a spherical hook appurtenance having a diameter of about 3/16".

Figure 7:
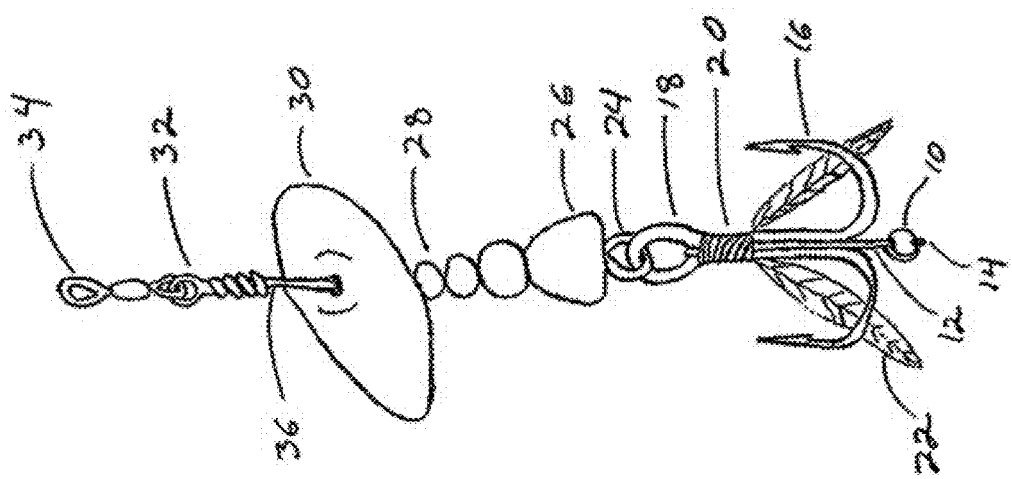
FIG. 7 shows a transverse view of the assembly of FIGS. 4-5 as included within wire construction of an in-line type spinner lure, blade facing front.

A further example embodiment of a hook appurtenance is illustrated in connection with a dressed treble hook in FIG. 7. In that arrangement, an in-line spinner type lure is wound at the hook eyelet 18 into a wire eyelet 24 to which the wire shaft 36 may be centered within a cone head weight 26, bead 28, and spinner of in-line type 30 and secured with a front eyelet 32, around which a swivel 34 was built.

Figure 8:
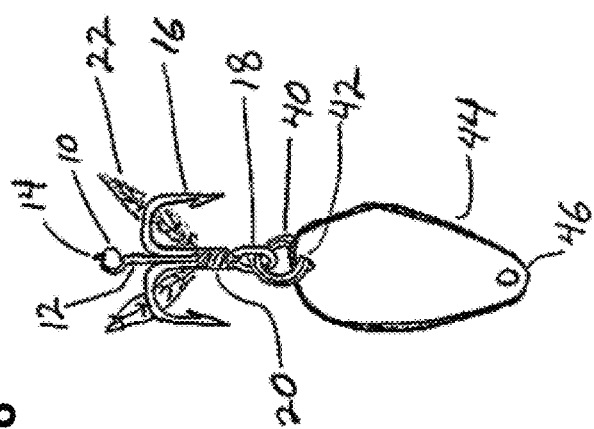
FIG. 8 shows a transverse view of the assembly of FIGS. 4-5 as included using conventional type connector to spoon type lure.
Figure 11:
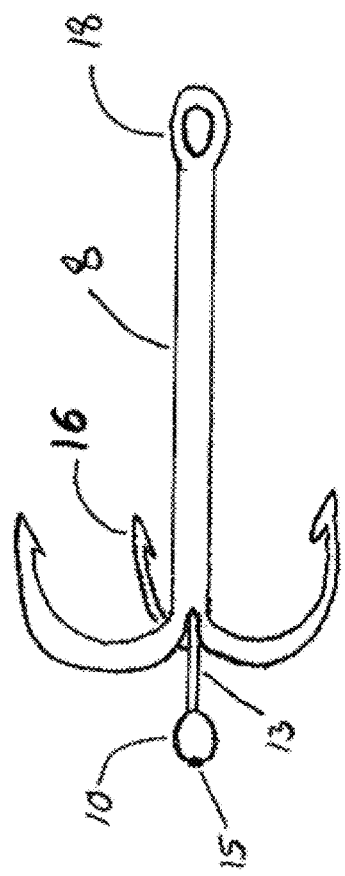
FIG. 11 shows a side view of a welded shank treble hook with an additional fourth shank piece extending from hook shank opposite eyelet and acting as a hook appurtenance, in this further embodiment.

A further example embodiment as shown on a dressed treble hook in FIG. 8 is shown using a connector known as a split ring 40 to an eyelet 42 on a spoon type body 44 and connected to line with a front eyelet 46.

Figure 9:
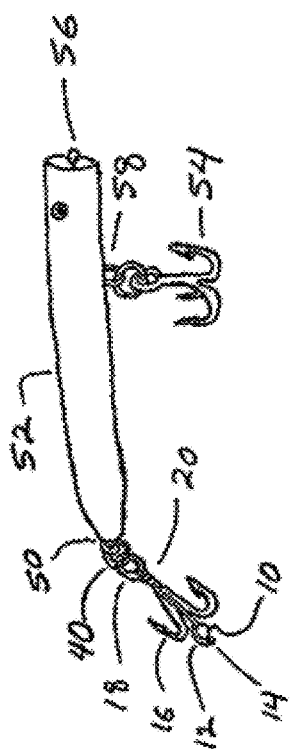
FIG. 9 shows a transverse view of the assembly of FIGS. 4-5 as included using conventional type connector to topwater type lure.

In a still further example embodiment, a dressed treble hook is shown in FIG. 9 using connector referred to as a split ring 40, which connects to an eyelet 50 on a topwater type body 52 and connected to line with a front eyelet 56. In the embodiment shown, the hook appurtenance is associated with the rearmost hook as not to interfere with an anglers hand upon release. In alternative embodiments, the hook appurtenance 10 could be associated with hook 54 (attached to the lure by eyelet 58), but that would have the disadvantage of potentially allowing hook 16 to interfere with the angler's release of the lure.

Figure 10:
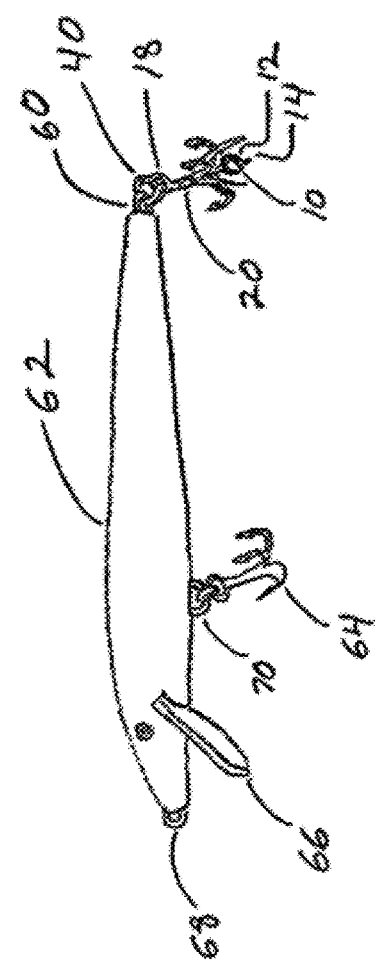
FIG. 10 shows a transverse view of the assembly of FIGS. 4-5 as included using conventional type connector to plug type lure.

The embodiment as shown on a dressed treble hook in FIG. 10 is shown using a conventional type connector known as a split ring 40 to an eyelet 60 on a plug-type body 62 with a lip 66 and connected to line with a front eyelet 68. In the embodiment shown, the hook appurtenance is associated with the rearmost hook as not to interfere with an anglers hand upon release. In alternative embodiments, the hook appurtenance 10 could be associated with hook 64 (attached to the lure by eyelet 70), but that would have the disadvantage of potentially allowing hook 16 to interfere with the angler's release of the lure.

Referring now to FIGS. 11-17, various alternative arrangements for the hook appurtenance and associated hooks are shown. In the example embodiment shown in FIG. 11, the hook appurtenance is formed as part of the hook itself, with each of the treble hooks 16 individual shanks 8 along with an additionally included shank 13 extends beyond the bend of the hook where a bead 10 may be affixed upon the shank and kept in place by a weld 15.

Figure 13:
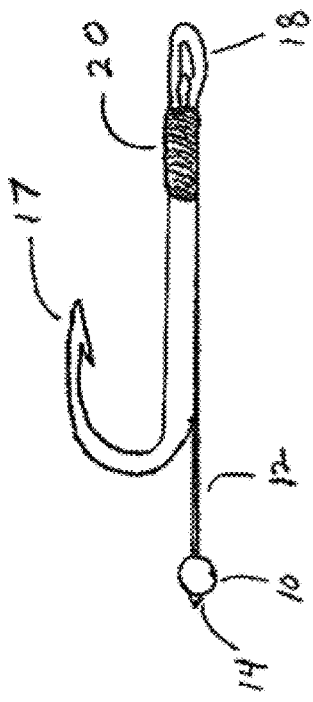
FIG. 13 shows a view of a line and bead assembly forming a hook appurtenance affixed to single hook.
Figure 12:
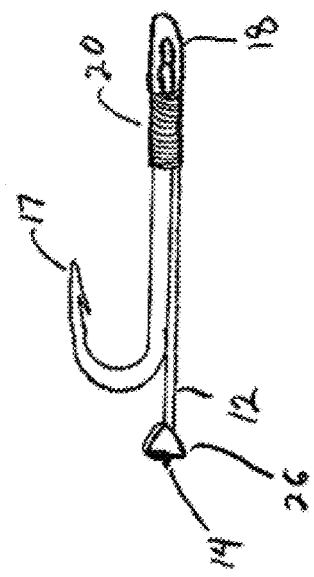
FIG. 12 shows a view of a line and cone head assembly forming a hook appurtenance affixed to single hook.

In the alternative embodiment shown in FIG. 12, a cone head 26 and line 12 and knot 14 assembly are affixed to a single hook 17 through the hook eyelet 18 and attached with thread 20. In contrast, in the embodiment as shown in FIG. 13, a round bead 10 and line 12 and knot 14 assembly are affixed to a single hook 17 through the hook eyelet 18 and attached with thread 20.

FIG. 14 illustrates a version of the hook appurtenance that uses a cylindrical sleeve that includes a top opening 80 a cylindrical body 82 spanning down to a bottom opening 84 extending using a flap of conduit facing forward 86 to an ergonomic mass 88. In the alternative view shown in FIG. 15, a cylindrical type sleeve may include a top opening 80 a cylindrical body 82 spanning down to a bottom opening 84 extending using a flap of conduit facing away 86 to an ergonomic mass 88.

In the embodiment as shown in FIG. 16, a cylindrical type sleeve, such as that shown in FIG. 14 and FIG. 15, is slid bottom opening 84 first over hook eyelet 18 until it becomes exposed through top opening 80 with the body of the sleeve 82 resting over the shank 8 of the hook 16 allowing the flap of formed conduit 86 to extend an ergonomic mass 88 beyond the bend of the hook 16. In the alternative view as shown in FIG. 17, a rear view of the embodiment of FIG. 16 is shown, in which a cylindrical type sleeve such as is shown in FIG. 14 and FIG. 15 is slid bottom opening 84 first over hook eyelet 18 until it becomes exposed through top opening 80 with the body of the sleeve 82 resting over the shank 8 of the hook 16 allowing the flap of formed conduit 86 to extend an ergonomic mass 88 beyond the bend of the hook 16.

Figure 20:
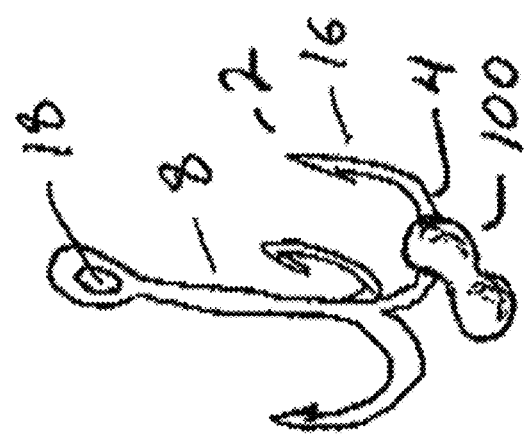
FIG. 20 shows a treble hook including a molded mass useable as a hook appurtenance, in an alternative embodiment.

In the embodiment shown in FIG. 20, a molded mass 100 is pierced with a point 2 of the hook 16 and slides down to the bend 4 of the hook 16. In this embodiment, the molded mass 100 can be used in the alternative to the ergonomic mass 88, or beads as discussed above.

Figure 19:
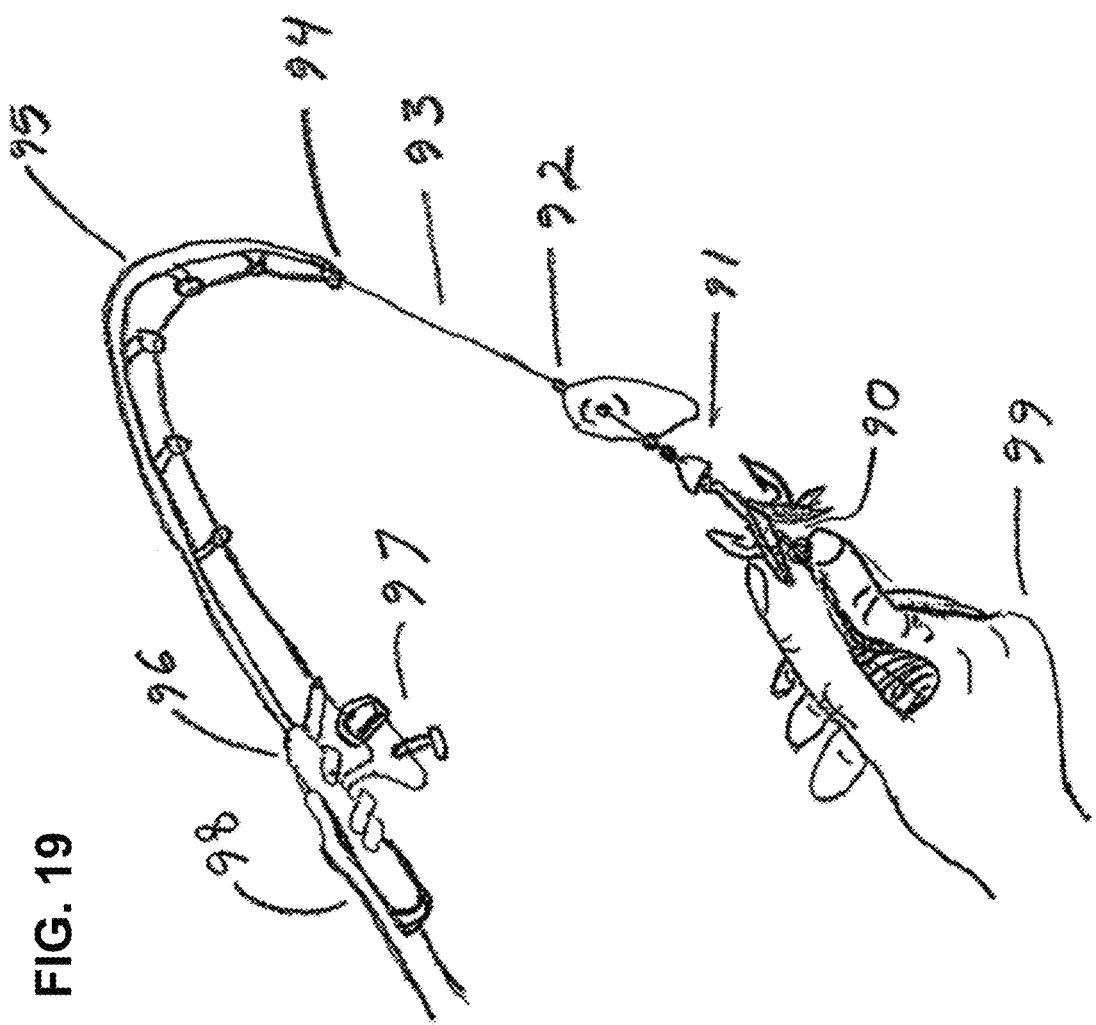
FIG. 19 shows a facing away view of the method of casting including parts and gear described herein.

Referring to FIGS. 1-20 generally, and specifically to FIG. 19, in use the hook appurtenance will be gripped by an angler, preferably (as discussed above) at a position past a bend and generally aligned with the shank of the fishing hook that is included in a lure. As noted above, preferably this is a "rearmost" hook of a lure that includes two or more hooks. The angler can then tension the line attached to the lure and hook, causing a bend in a rod attached to the line. The angler can then aim the rod and release the hook appurtenance, thereby releasing tension in the rod and casting the fishing lure to a desired location. By using this casting method, the angler can avoid interference by any hooks of the lure while accurately casting under branches, or to other narrow areas where accuracy is critical.

This method of casting including an appurtenance 90 as shown in FIG. 19 is portrayed with a lure holding hand 99 grabbing said appurtenance 90 as included in a lure 91 which is attached at the lure eyelet 92 by fishing line 93. The appurtenance 90 and lure 91 can be any of the lures or appurtenances previously described. The rod holding hand 98 holds the rod handle 96 to which an attached reel 97 spooled with line 93. Tension in line 93 will then pull back the rod tip 94 to make the rod bend 95. Upon releasing the lure 91 from the lure holding hand 99, and in close succession releasing the line 93 near the reel from the rod holding hand 98 is how a slingshot cast is achieved.

Still referring to FIGS. 1-20 generally, although interconnection of the hook appurtenance is shown in the embodiments herein using fishing line, and thread with head cement to attach to the hook, alternative methods of manufacturing can provide other methods for attachment and types of ergonomic shapes for said mass. Furthermore, manufacturing may also utilize more streamlined design to build said mass as to incorporate directly into design of the hook or to offer manufacturing of specialized materials to be attached to the hook for the purpose of utilizing this method of casting. Furthermore, although, in some embodiments the slingshot bead is best suited for use on the opposite side of the lure from the line tying to the eyelet, it may be used in other locations of lure that are available for attachment.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A lure assembly comprising:
 a fishing hook having an eyelet and a bend separated by a shank, the eyelet being located at a forward end, and adapted to attach the fishing hook to a rearmost attachment point of a lure body or to a fishing line, and the bend being located at a rearward end of the fishing hook and terminating at a point separated from the shank by a gape; and
 a hook appurtenance attached to the fishing hook and positioned entirely past the bend in a rearward direction away from and opposite the eyelet, such that the hook appurtenance is spaced apart from the shank and generally aligned with the shank of the fishing hook, the hook appurtenance including a bead forming a resilient structure for gripping by a person, the bead having a size smaller than a gape of the hook to avoid interfering with operation of the fishing hook.

2. The lure assembly of claim 1, wherein the hook appurtenance is affixed to the fishing hook by a second fishing line.

3. The lure assembly of claim 2, wherein the second fishing line passes through the bead.

4. The lure assembly of claim 3, wherein the second fishing line extends along the shank and beyond the bend, and wherein the lure assembly further includes a knot in the second fishing line maintaining the position of the hook appurtenance.

5. The lure assembly of claim 4, wherein the lure assembly lacks an eyelet positioned at a rearward end of the hook appurtenance.

6. The lure assembly of claim 5, wherein the fishing hook is attached to a rearmost eyelet of the lure body having a plurality of eyelets.

7. The lure assembly of claim 1, wherein the fishing hook comprises a treble hook.

8. The lure assembly if claim 1, wherein the fishing hook comprises a single hook.

9. The lure assembly of claim 1, further comprising a spinner attached in line with the eyelet.

* * * * *